V. H. & H. L. KADISH.
CONTINUOUS PROCESS OF FORMING FERTILIZER MATERIAL.
APPLICATION FILED APR. 27, 1918.
1,298,960.
Patented Apr. 1, 1919.
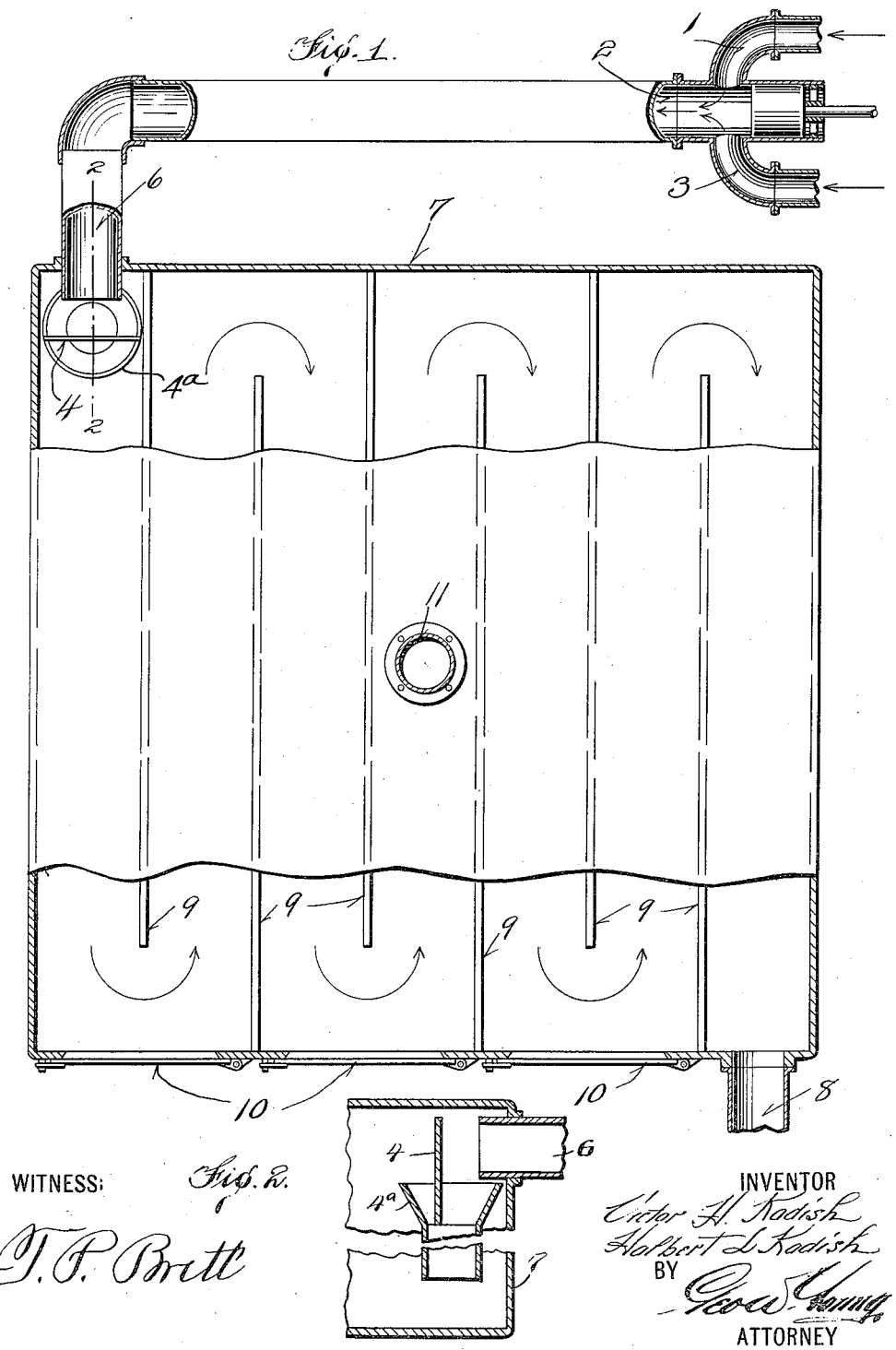

UNITED STATES PATENT OFFICE.

VICTOR H. KADISH AND HALBERT L. KADISH, OF MILWAUKEE, WISCONSIN.

CONTINUOUS PROCESS OF FORMING FERTILIZER MATERIAL.

1,298,960.　　　　　Specification of Letters Patent.　　Patented Apr. 1, 1919.

Application filed April 27, 1918. Serial No. 231,250.

*To all whom it may concern:*

Be it known that we, VICTOR H. KADISH and HALBERT L. KADISH, citizens of the United States, and residents of Milwaukee, in the county of Milwaukee and State of Wisconsin, have invented certain new and useful Improvements in Continuous Processes of Forming Fertilizing Material; and we do hereby declare that the following is a full, clear, and exact description thereof.

Our invention relates to means for the preparation of fertilizer material from tannery waste, the same being somewhat similar to the method described and claimed in the application of Victor H. Kadish, Serial No. 171,805, filed May 31, 1917.

The principal object of the present invention is to provide an arrangement for the continuous formation of fertilizer material in contra-distinction to the means illustrated in the foregoing application in which predetermined quantities of wastes are successively treated in a vat.

With this general object in view the invention consists in the improved process, the steps of which will be hereinafter more particularly described and claimed.

The drawing forming part of this application illustrates more or less diagrammatically in Figure 1 one form of apparatus in which our process may be performed, certain parts of the apparatus being broken away and in section, while the other parts are in plan view.

Fig. 2 is a detail sectional view on the line 2—2 of Fig. 1.

As particularly pointed out in the foregoing application wastes from tanneries contain large quantities of desirable fertilizer materials, such not only being contained in the waste liquor from the sodium sulfid dehairing vats, but also in the more solid matters which result from other treatment of hides and skins, for instance, hair slime and otherwise partially destroyed hair which may be recovered from washing drums, washing vats, unhairing machines, etc. If desired this more solid matter may be partially digested by throwing the same in the sulfid waste storage tank, to be hereinafter again referred to, and therein agitated. If not salvaged all of this valuable fertilizer material is thrown away with the wastes, as it will not separate of its own volition, and prior to the time of the invention claimed in said application it was impossible to separate the valuable constituents of the waste from those which contained no value as fertilizers.

The separation is now readily procured merely by the addition to the sulfid liquor waste including said hair slime and the like, of an acid, such as sulfuric or sulfurous acid, either of the ordinary commercial variety or that which is obtained as a by-product in other arts, the same being added in sufficient quantities to neutralize the normal alkalinity of the wastes and to give the same a slight acid re-action. This coagulates or precipitates the valuable fertilizer materials held in solution or suspension in the waste liquors.

Our present invention relates to the means for carrying out this separation continuously and in unlimited quantities of liquor wastes. Referring therefore to the accompanying drawing, 1 indicates the discharge end of a waste liquor supply pipe which connects with one end of an elongated mixing chamber or passage-way in the form of a pipe 2, the other end of said pipe 1 being connected with a suitable sulfid liquor waste storage tank (not shown). Also connected with the end of the mixing passage-way and preferably adjacent the discharge end of said pipe 1 is a second supply pipe 3 through which a suitable acid of desired strength is fed into the former from a supply tank (not shown). The rate of flow of both of the liquids entering the mixing chamber 2 is regulated in any desired or preferred manner, the flow of the acid with respect to the waste liquor being such as to cause the neutralization of the latter as hereinbefore mentioned.

The elongated mixing chamber has one end connected with the top, or with the side wall adjacent the top, of a separation chamber 7 as shown at 6 in the drawing, and by time the combined acid and waste liquors reach the chamber 7 they will be more or less co-mingled and chemical re-action already have taken place to a considerable extent. It is desirable, however, that this combined acid and waste liquor be thoroughly co-mingled before or simultaneously with its entrance into the chamber 7, therefore adjacent the end 6 of the pipe 2 is preferably disposed a deflecting plate 4, which is disposed in and extends upwardly from the flared mouth of a vertically disposed open end cylindrical shell 4ᵃ. Thus the combined acid and waste liquor is discharged against the baffle plate and will be caused to mix more perfectly as it is discharged into the chamber through the cylindrical incasement of the baffle plate.

The separation chamber 7 is provided between its inlet and its outlet 8 with means for retarding the flow of combined waste liquors and acid therethrough, the same preferably being in the form of baffle plates 9 arranged in staggered relation as indicated in the drawing. In this chamber complete separation of the valuable fertilizer materials from the materials which are not valuable as such takes place.

The tortuous passage of the liquids through the chamber 7 naturally retards their speed of movement and the heavier or solid constituents thereof settle to the bottom and are collected therefrom, such heavier constituents being the valuable fertilizer material. Furthermore the acid has an opportunity to completely perform its function of separating. Thus by the time the salvaged waste liquids reach the outlet 8 all of their valuable properties will have been precipitated out in the form of a spongy mass, and the effluent comparatively free from solids is discharged directly into a sewer or the like. This spongy mass of fertilizer material may be from time to time shoveled or otherwise removed from the bottom through the side doors 10. This material is immediately ready for use as a fertilizer, but if desired it may be compressed or dried to remove any, or a portion of, the liquid which may remain therein after its removal from the chamber.

As a result of the chemical re-action in the separation chamber between the sulfid liquor waste and the acid, hydrogen sulfid gas is generated, the same being drawn off through an outlet pipe 11. This hydrogen sulfid gas may be utilized to form sodium sulfid crystals, as for instance by running the same into a concentrated solution of sodium carbonate or soda ash with the consequent formation of sodium sulfid liquor. Or any other use may be made of the gas.

Any preferred apparatus in addition to the one illustrated and described may obviously be employed for carrying out the several steps of our continuous process as outlined in the appended claims.

We claim:—

1. The continuous method of recovering fertilizer material from tannery liquor waste which consists in adding together predetermined quantities of waste and precipitating liquid, agitating the liquid and waste to thoroughly co-mingle the same, running the co-mingled liquid and waste into a separation chamber, causing said co-mingled liquid and waste to assume a tortuous passage through said chamber to permit the precipitating liquid and waste to re-act on one another and to permit the resultant solid material to precipitate.

2. The continuous method of recovering fertilizer material from tannery waste which consists in continuously running waste into a mixing chamber at a predetermined rate of flow, continuously running precipitating liquid into said mixing chamber at a predetermined rate of flow, agitating the fluid formed of the waste and the precipitating liquid at its point of discharge from the mixing chamber to thoroughly co-mingle the same, and then allowing the solid constituents of the fluid to separate from the liquid portions thereof.

3. The continuous method of recovering fertilizer material from tannery liquor waste which consists in continuously running alkaline wastes into a mixing chamber at a predetermined rate of flow, continuously running an acid into said mixing chamber at a predetermined rate of flow, agitating the alkaline wastes and acid at their point of discharge from the mixing chamber to thoroughly co-mingle the same and to cause chemical re-action, then allowing the solid constituents precipitated by the acid to settle while the combined waste and acid flows through a separation chamber.

4. The continuous method of recovering fertilizer material from tannery liquor waste which consists in running predetermined quantities of waste and precipitating liquid together through a long passage, agitating the fluid formed of said waste and liquid at the point of discharge from the passage to thoroughly co-mingle the same, running the thoroughly co-mingled waste and liquid through a separation compartment, and retarding the movement through the separation compartment of the fluid formed of the co-mingled waste and liquid to separate the solid constituents thereof from the liquid portions.

5. The continuous method of recovering fertilizer materials from tannery liquor wastes which consists in running predetermined quantities of alkaline waste and acid together through a long passage, agitating the combined alkaline waste and acid at the point of discharge from the passage to thoroughly co-mingle the same and to cause the same to re-act on one another, running the co-mingled alkaline waste and acid through a separation compartment to procure further co-mingling and complete chemical re-action, and retarding the movement through the separation chamber of the combined alkaline waste and acid to permit the solid constituents thereof formed by the chemical re-action to settle to the bottom of said separation compartment.

6. The continuous method of recovering fertilizer material from tannery sulfid liquor waste which consists in continuously running waste into a mixing chamber at a predetermined rate of flow, continuously running precipitating acid into said mixing chamber at a predetermined rate of flow, agitating the fluid formed of the waste and the acid at its point of discharge from the mixing chamber to thoroughly co-mingle the same, allowing the solid constituents of the fluid to separate from the liquid portions thereof, and recovering the resultant hydrogen sulfid gas created by the chemical re-action between the waste and acid.

In testimony that we claim the foregoing we have hereunto set our hands at Milwaukee, in the county of Milwaukee and State of Wisconsin.

VICTOR H. KADISH.
HALBERT L. KADISH.